S. A. SWANSON.
SCREW FEED.
APPLICATION FILED OCT. 25, 1916.
1,250,047.
Patented Dec. 11, 1917.
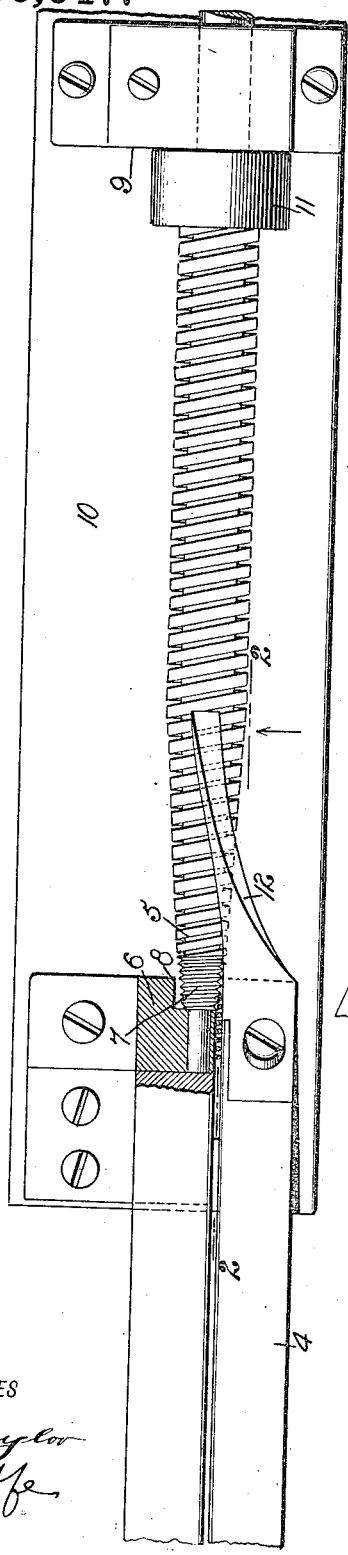
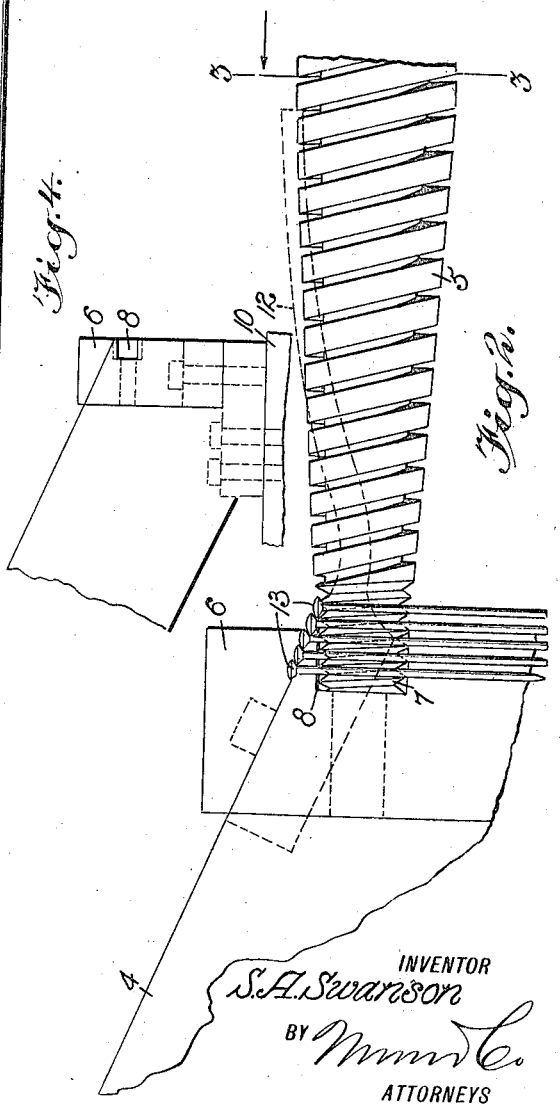
WITNESSES
INVENTOR
S. A. Swanson
BY
ATTORNEYS

UNITED STATES PATENT OFFICE.

SWAN AUGUST SWANSON, OF WATERBURY, CONNECTICUT.

SCREW FEED.

1,250,047.  Specification of Letters Patent.  Patented Dec. 11, 1917.

Application filed October 25, 1916. Serial No. 127,731.

*To all whom it may concern:*

Be it known that I, SWAN AUGUST SWANSON, a citizen of the United States, and a resident of Waterbury, in the county of New Haven and State of Connecticut, have invented a new and Improved Screw Feed, of which the following is a full, clear, and exact description.

My invention relates to screw feeds for pin stickers. An object thereof is to provide a simple, inexpensive and efficient screw feed in which the screw is so arranged as to reduce the wear thereof to a minimum.

A further object of the invention is to provide a screw feed in which the pins engage the screw at one side and proximate the end thereof, thereby reducing wear of the thread at the end and skipping, which is generally due to wear of the end of the thread.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a plan view of the feed partly broken away at the feed end of the screw to show the details of construction;

Fig. 2 is an elevation on line 2—2, Fig. 1;

Fig. 3 is a cross section on line 3—3, Fig. 2; and

Fig. 4 is an elevation of the block supporting the race and the bearing block for the feed screw.

Referring to the drawings, 4 is the pin race which is disposed obliquely to feed the pins gravitationally toward a screw 5 one end of which bears in a block 6. The block 6 forms a portion of the end of one side of the race. The screw 5 tapers toward the bearing block 6. The thread of the screw, which is rectangular changes to a triangular, round or sharp thread at the end of the taper, as shown at 7.

The bearing block 6 has a recess 8 to house a portion of the triangular thread of the screw, this recess being open on the side where the screw faces the race. The end of the screw at the thread 7 is reduced to fit snugly into the reduced bore of the block 6. The other end of the screw bears in a suitable bearing block 9, both blocks being mounted on a bed 10. The screw has a collar 11 which prevents longitudinal displacement of the screw relative to the bearing block 6. The means for rotating the screw is not shown in the drawing.

The race 4 on the side opposite the block has a guide 12 which winds from the side of the screw up to the top thereof, as shown in Fig 1, to bring the pins 13 into a substantially horizontal position opposite the plunger, not shown, which forces the pins into the paper.

The pins 13 which feed gravitationally toward the screw are delivered at one side and proximate the end of the screw. The distance between the threads 7 is substantially equal to the distance between the pins when they are moving along the raceway. In consequence, the pins engage the threads 7 of the screw as it rotates and moves the engaged pins toward the rectangular threads, which moves them into a substantially horizontal position, as has been previously mentioned. The engagement of the pins with the screw takes place at one side and proximate the end thereof, whereby the wear of the thread is decreased, and permits the use of the screw for a considerable longer time than hitherto has been possible. Further, by eliminating the wear at the beginning of the thread the skipping of pins by the screw is also eliminated.

The principal point is to dispose the thread 7 of the screw so as to bring the pins coming from the race into engagement with the screw at one side and proximate the end thereof, and not into engagement with the beginning of the thread of the screw as is done at present.

I claim:

1. In a screw feed of the class described, the combination of a pin race adapted to feed the pins gravitationally, and a screw having a rectangular thread terminating with a substantially triangular thread, the distance between which triangular threads is substantially that of the distance between the pins in the race, and means associated with the screw and race for presenting said triangular threads to the race to bring the pins into engagement with the screw at the side and proximate the end thereof.

2. In a screw feed of the class described, a screw having a tapering rectangular thread which terminates near the end of the taper with a triangular thread, substantially as and for the purpose set forth.

3. In a screw feed of the class described, the combination of a pin race disposed to feed the pins gravitationally, a block at the lower end of said race forming a portion of one side of said race, and a screw having a tapering portion disposed in proximity to the race, said block having a recess opening into the race, said recess being adapted to receive the end of the tapering portion of the screw and bring it into the race through the opening in the recess, said tapering portion within the race having threads for engaging the pins on the side of the screw and proximate the end engaged in the block.

4. In a screw feed of the class described, the combination of a pin race, a screw mounted to revolve, and bearing means for the screw to bring the side of the screw proximate one end thereof to receive the pins coming from the race between the ends of the threads.

5. In a screw feed of the class described, the combination of a pin race adapted to feed the pins gravitationally and a screw having one end thereof bearing at the end of the race and presenting the threads thereof to the race to engage between the ends of the threads the pins coming from the race at one side and proximate the end of the screw which is at the end of the race.

6. In a screw feed of the class described, the combination of a pin race adapted to feed the pins gravitationally, a bearing block at one side of the race and forming a portion of the same, and a screw bearing in the block so as to engage the pins coming from the race at one side between the ends of the threads and proximate the end bearing in the block.

SWAN AUGUST SWANSON.

Witnesses:
E. E. FORMAN,
C. E. McKINNEY.